United States Patent [19]

Kaminski et al.

[11] 4,401,866
[45] Aug. 30, 1983

[54] LEVER CONTROL APPARATUS

[75] Inventors: David C. Kaminski, Sylvania; William H. Graumlich, Toledo, both of Ohio

[73] Assignee: Dana Corporation, Toledo, Ohio

[21] Appl. No.: 267,481

[22] Filed: May 21, 1981

[51] Int. Cl.³ .............................................. H01H 9/06
[52] U.S. Cl. .................................................. 200/61.88
[58] Field of Search ............... 200/16 C, 16 D, 61.88, 200/61.91, 61.89

[56] References Cited

U.S. PATENT DOCUMENTS

| | | | |
|---|---|---|---|
| 1,825,917 | 10/1931 | Obee | 200/61.88 |
| 1,829,037 | 10/1937 | Bobroff | 200/6 A |
| 2,706,753 | 4/1955 | McGowan | 200/6 A |
| 2,841,659 | 7/1958 | Eitel | 200/5 R |
| 2,895,021 | 7/1959 | Mekelburg | 200/5 R |
| 3,030,459 | 4/1962 | Elliott et al. | 200/16 C X |
| 3,298,483 | 1/1967 | Morrison | 192/3.58 |
| 3,360,620 | 12/1967 | Ward | 200/61.28 |
| 3,410,970 | 11/1968 | Raab | 200/61.91 |
| 3,639,705 | 2/1972 | Rayner | 200/6 A |
| 3,707,093 | 12/1972 | Worden | 74/471 XY |

Primary Examiner—J. R. Scott
Attorney, Agent, or Firm—Frank B. McDonald

[57] ABSTRACT

A vehicular lever control apparatus includes two relatively movable levers, a first being constrained to pivotal movement about a first axis and having a multiple position switch affixed thereto. A second lever is pivotally connected to the first lever and moves axially therewith as well as transversely about a second axis perpendicular to the first axis. Transverse movement of the second lever actuates the switch on the first lever. In a preferred embodiment, the switch is a three-position electric toggle switch for selection of reverse, neutral and forward modes of a transmission. Movement of the second lever about the first axis thus causes like movement of the first lever, which effects changes of gear ratios in a continuously variable speed transmission. The second lever thus acts as a dual function control lever for (1) varying speed ratios when moved about the first axis, and (2) selection of transmission directional modes when moved about the second axis.

8 Claims, 5 Drawing Figures

LEVER CONTROL APPARATUS

BACKGROUND

This invention relates generally to control means for transmissions in vehicles and particularly to means incorporating relatively movable levers for actuation of a plurality of control functions. More particularly, the invention relates to means employing the simultaneous control of both transmission mode selection and variation of transmission gear ratios through physical movement of only one of the levers.

In continuously variable speed transmissions, electronic controls involving multiple switches have been found suitable for performing multiple inter-related functions by operators of vehicular equipment. However, combinations of switch positions characteristically include certain failure combinations which are to be avoided and thus placards generally warn against engagement of such combinations. Even so, incompatible switches are occasionally actuated simultaneously through operator inattention or incompetence, creating damage to the equipment and endangering safety of people. An interlocking and/or other type of fail-safe switching means could alleviate or avoid the latter potential as related to control of continuously variable-speed transmissions.

SUMMARY OF INVENTION

The invention disclosed herein provides a fail-safe system for the simultaneous control of vehicular transmission gear ratios and forward/neutral/reverse mode selections. As such, it is not subject to operator inadvertence or error. The invention provides control apparatus which incorporates a system of relatively movable levers, a first being constrained to pivotal movement in one direction only and containing a multiple position switch rigidly affixed thereto. A second lever is pivotally connected to the first lever, so as to move transversely relative to the former. The second lever thus acts as a dual function control lever, which when moved in the first direction provides changes in gear ratios, while when moved transversely thereto actuates the aforesaid multiple position switch to effect changes in transmission directional mode. In a preferred embodiment, the switch is an electric toggle switch, the toggle being actuated by transverse pivotal movement of the second (control) lever. For this purpose, the control lever contains a switch positioner which alternately engages opposing sides of the toggle to effect movement thereof between relative switch positions. The switch is preferably of the double pole, double throw type, wherein each of said multiple positions generates a distinct control signal, one for each of the aforedescribed directional modes.

DETAILED DESCRIPTION OF PREFERRED EMBODIMENTS

Figure 1:
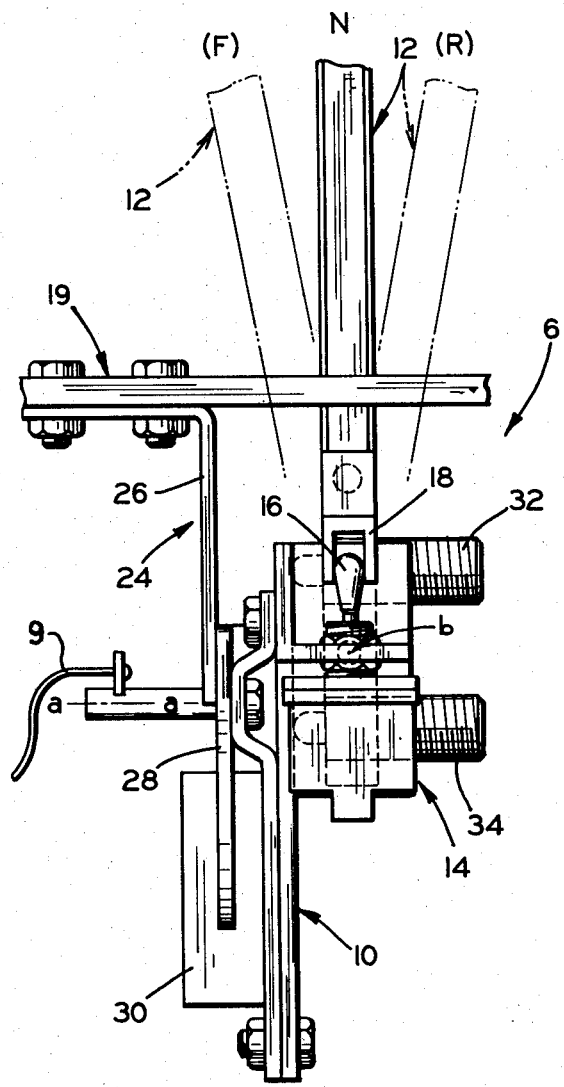
FIG. 1 is an end elevation of a preferred embodiment of the control apparatus of this invention, showing a transversely shiftable vehicular transmission control lever in neutral as well as forward and reverse (phantom) positions.
Figure 2:
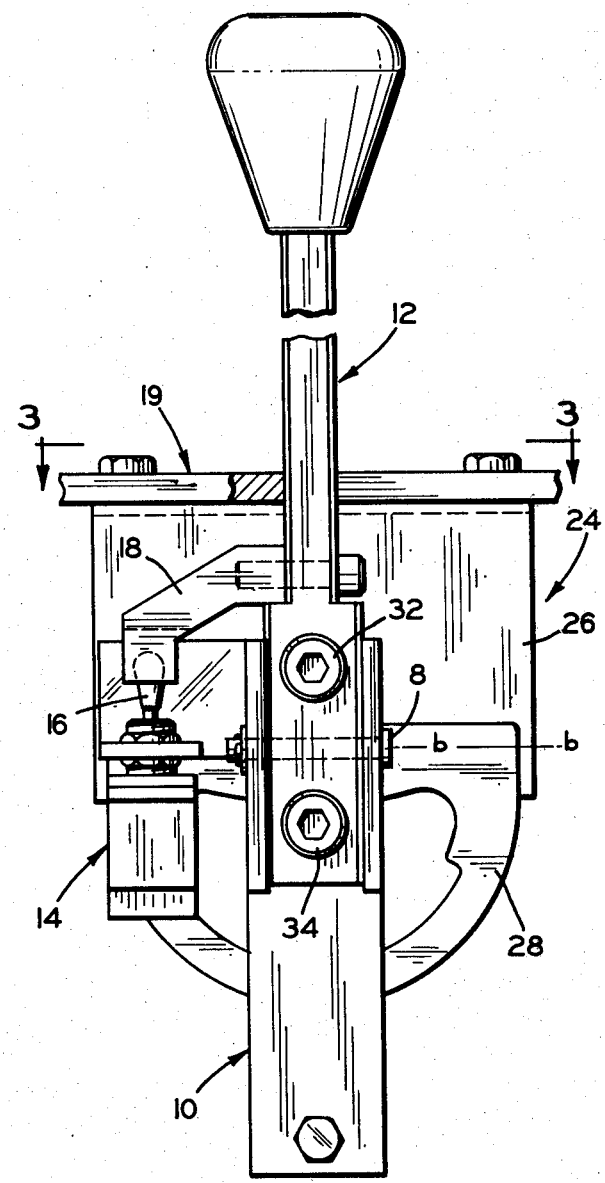
FIG. 2 is a side elevation of the control apparatus shown in FIG. 1.

A preferred embodiment of the lever control apparatus 6 of this invention is as shown generally in FIGS. 1 through 5. Referring specifically to FIGS. 1 and 2, a vehicular transmission gear ratio lever 10 pivots in a first direction about a rotational axis a—a (FIG. 1) via either manual or automatic movements of an axially and transversely movable control lever 12 connected thereto. The ratio lever 10, in the preferred embodiment described herein, is constrained to movement about axis a—a, and movement thereof results in changes of gear ratios in a continuously variable speed vehicular transmission via cable system shown fragmentarily at 9. The control lever 12 is pivotally attached to the ratio lever 10 by connecting member 8 (FIG. 2), and moves transversely relative to the ratio lever about axis b—b, which passes through the centerline of the connecting member 8.

Rigidly mounted on the ratio lever 10 is a multiple position switch 14, by which selection of forward, neutral, and reverse transmission directional modes is effected. The switch 14 includes a toggle 16, which moves transversely to the first direction, and is actuated by a switch positioner 18 rigidly affixed to the aforesaid axially and transversely movable control lever 12.

Movement of the control lever 12 about axis a—a will effect like movement of the ratio lever 10 about axis a—a to control transmission output torque via changes in transmission gear ratios. On the other hand, transverse movements of the control lever (about axis b—b, FIG. 2) will effect selection of transmission directional modes via the actuation of switch 14 through the interaction of positioner 18 with toggle 16. For this purpose, the switch 14 is actuated about axis b—b, as shown in FIG. 2. In the preferred embodiment, the switch 14 is a three-position switch.

Figure 3:
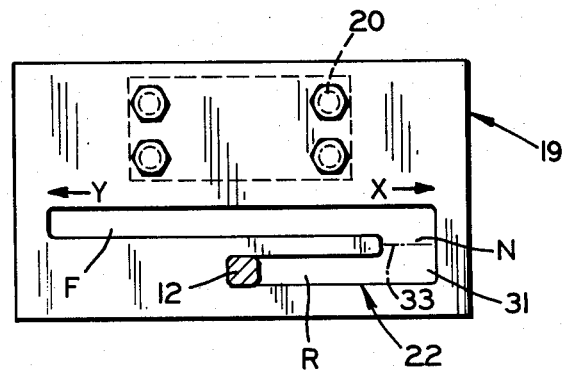
FIG. 3 is a view along lines 3—3 of FIG. 2.

FIG. 3 shows the floor of a fixed console 19 through which a manually operated embodiment of the control lever 12 extends. Bolt holes 20 are employed for fixing the console to the vehicle for operational movement of the control lever 12 relative thereto, and a shift-movement pattern 22 in the console 19 provides a positional constraint on the control lever 12. In the preferred embodiment hereof, the pattern 22 has a "J" configuration whereby the long leg F of the "J" represents the forward directional mode, the short leg R represents the reverse directional mode, while the bridge 31 of the "J" represents the zero directional mode, or the neutral mode. Movement of the control lever 12 in the direction of the arrow "Y" in either the "F" or "R" modes results in lower transmission gear ratios, resulting in faster vehicular speeds for a given engine speed. Conversely movement of the lever 12 in the "X" direction results in slower vehicular speeds until the bridge 31 of the "J" is reached, at which time the vehicular speed has approached zero, and the control lever 12 is then forced by spring into the neutral position as explained below. In the "J" configuration as shown here, the forward mode possesses a greater speed range than does reverse. This is because the continuously variable speed transmission for use therewith usually contains a greater number of possible gear combinations in its forward mode than in its reverse mode. Other configurations fall within the scope of this invention, as the configuration used depends only on the circumstances of transmission gearing arrangement.

Referring back to FIGS. 1 and 2, bolted to the console 19 and extending downwardly therefrom is a lever mounting plate assembly 24 comprised of a fixed locator plate 26 having a friction plate 28 affixed thereto. The friction plate provides a friction locking surface for interface with a cable backlash system 30, as will be appreciated by those skilled in the art.

Referring now specifically to FIG. 1, the control lever 12 is shown positioned in the "N" or neutral position, as well as in the "F" and "R" positions, the latter in phantom. As mentioned, the control lever pivots about the axis b—b (FIG. 2) which is viewed as a point, b, in FIG. 1. Above and below point b are two spring plungers 32 and 34, affixed to the control lever 12 for spring loading the lever 12 toward the neutral or center position, as shown. Referring to FIG. 3, whenever the control lever 12 is moved along legs F or R in the X direction, upon reaching the bridge 31 of the "J", it will be forced by one of the plungers into the "N" or neutral position or the center 33 of the bridge 31. As apparent from FIG. 1, for example, if the control lever 12 is in the "F" position, it will be forced by plunger 32 toward the neutral position, which in turn will cause the positioner 18 to move toggle 16 to the neutral mode position of switch 14, creating a signal to cause the transmission to shift into neutral, as further explained below.

Figure 4:
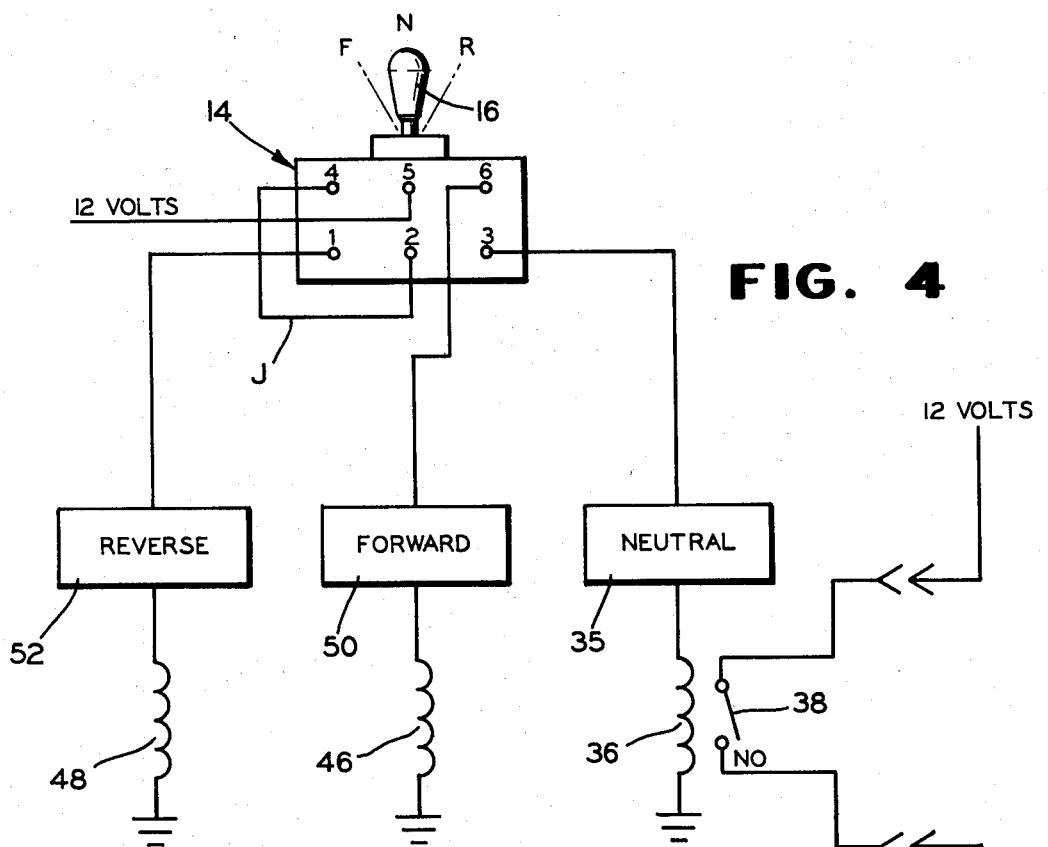
FIG. 4 is a schematic view of a preferred embodiment of a multiple position switch incorporated in this invention.

FIG. 4 depicts a schematic arrangement of the multiple position switch 14 as incorporated in this invention. The switch is preferably of the environmentally sealed variety, for example, Model No. 8511K14, as manufactured under the Cutler-Hammer* trademark, a double pole double throw switch having three positions. In the preferred embodiment, the switch controls the "R", "N", and "F" directional modes of the transmission, respectively. As shown, the preferred switch contains six terminals, each numbered 1-6 as shown. In the preferred embodiment, terminals 2 and 4 are permanently connected via jumper J, and a 12 volt power supply is permanently connected to terminal number 5 (see FIGS. 4 and 5). In addition, the terminals are used in series for each mode, thus unconventionally as related to double throw switches.

*Registered U.S. Patent and Trademark Office

Figure 5:
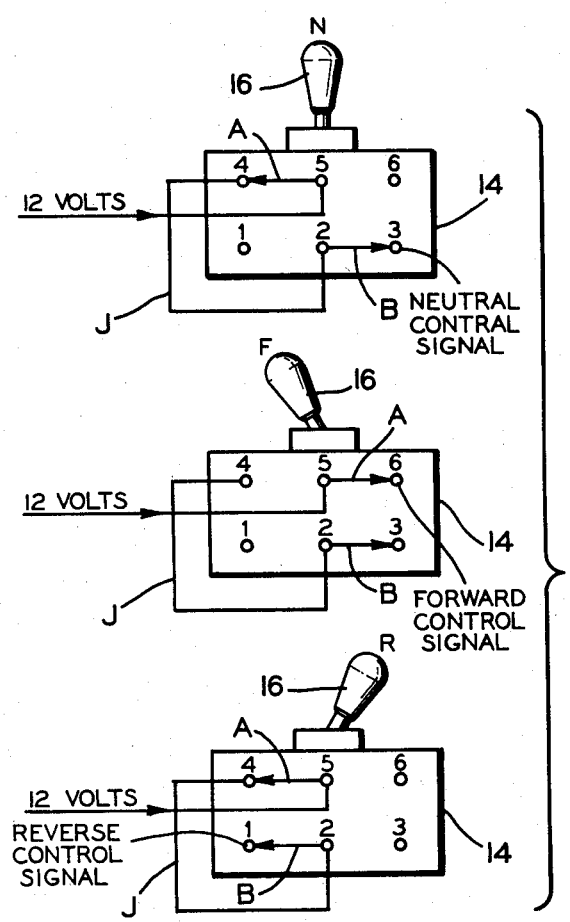
FIG. 5 is a view of the switch of FIG. 4, showing contact positions for each of three switch directional modes.

For the various switch modes, contacts A and B are operated in the positions as shown in FIG. 5. Thus, for example, when toggle 16 is in the neutral or "N" position, the terminals 2 and 3 and terminals 4 and 5, respectively, are utilized to generate a neutral control signal at terminal 3, which in turn will cause the transmission to shift into neutral.

In the preferred embodiment, a normally open contact 38 (FIG. 4) is used for interlocking a starter motor 44, so that an associated vehicle (not shown) is unable to be started unless the lever control 12 (FIG. 1) is in the neutral position. Thus when the vehicle is in neutral, the 12 volt power source flows into terminal 5, then to terminal 4, to terminal 2, to terminal 3, then through a neutral 12 volt relay 35 to a low power neutral start relay 36 which closes the normally open contact 38. This feature allows starting current to flow into a starting solenoid relay 40 which closes solenoid switch 42, whereupon the starter motor 44 may be actuated by the 12 volt battery supply. In the other two positions, forward and reverse, hydraulic solenoid valves 46 and 48 respectively, are actuated by 12 volt power relays 50 and 52, respectively. In the latter positions, the contact 38 remains open; thus there is no starter current to the starter solenoid relay 40 for actuating the starter motor 44. It is therefore apparent that this invention incorporates a novel switching arrangement for interlocking the starter motor as described, in addition to providing a novel lever control system for actuation of a continuously variable speed transmission.

What is claimed is:

1. A control apparatus comprising:
   (a) a gear ratio lever pivotally moveable about a first axis,
   (b) a multiple position switch fixed to and moveable with said gear ratio lever, said switch including a toggle, said toggle limited to perpendicular movement with respect to said first axis, and
   (c) a control lever pivotally moveable about a second axis, said second axis perpendicular to said first axis, said control lever connected to said ratio lever and perpendicularly moveable with respect to said first axis, said control lever comprising means for moving said toggle transversely to the movement of said gear ratio lever.

2. The control apparatus of claim 1 wherein said control lever comprises means for modulating drive gear ratios of a multiple speed transmission in a vehicle.

3. The vehicular control apparatus of claim 2 wherein said toggle actuates said switch for alternating among forward, neutral, and reverse modes of said transmission.

4. The vehicular control apparatus of claim 3 wherein said gear ratio lever comprises means for modulating forward and reverse gear ratios of said transmission via axial movement thereof, whereby said movement of said ratio lever is effected by movement about said first axis of said control lever connected thereto.

5. The vehicular control apparatus of claim 4 wherein selection of forward, neutral, and reverse modes of said transmission is effected by said transverse movement of said control lever relative to said ratio lever.

6. The vehicular control apparatus of claim 5 wherein said means for actuating said toggle comprises a positioner fixed to said control lever, whereby said positioner alternately engages opposing sides of said toggle upon transverse movement of said control lever.

7. The vehicular control apparatus of claim 6 wherein said electric switch comprises a three position, double pole switch having a double throw wherein a plurality of electrical terminals therein are disposed for operation in series with respect to each of the forward, neutral, and reverse modes of said transmission, each of said forward, neutral, and reverse modes corresponding to one of said three positions of said switch.

8. The vehicular control apparatus of claim 7 wherein each of said switch positions provides a distinct control signal for reverse, neutral, and forward transmission modes, respectively.

* * * * *